United States Patent [19]

Anderson et al.

[11] 4,031,290

[45] June 21, 1977

[54] MERCAPTAN BLOCKED THERMOSETTING COPOLYMERS

[75] Inventors: Carl Clement Anderson, Menomonee Falls, Wis.; Rostyslaw Dowbenko, Bigsonia, Pa.

[73] Assignee: PPG Industries, Inc., Pittsburgh, Pa.

[22] Filed: Sept. 20, 1976

[21] Appl. No.: 724,900

Related U.S. Application Data

[62] Division of Ser. No. 248,846, May 1, 1972.

[52] U.S. Cl. .............................. 428/480; 260/17 R; 260/22 CB; 260/22 T; 260/23 P; 260/23 AR; 260/23 EP; 260/40 R; 260/42; 260/42.52; 260/851; 260/856; 260/870; 260/872; 260/873; 428/500

[51] Int. Cl.$^2$ ................. C08F 28/02; C08L 67/06; C08L 67/08

[58] Field of Search .......... 260/823, 2 R, 872, 870, 260/873, 75 T, 79.5 C, 79.7; 428/480, 500

[56] References Cited

UNITED STATES PATENTS

| | | | |
|---|---|---|---|
| 3,118,852 | 1/1964 | Christenson et al. | 260/874 X |
| 3,169,945 | 2/1965 | Hostettler et al. | 260/874 X |
| 3,465,057 | 9/1969 | Cameron et al. | 260/874 X |
| 3,564,076 | 2/1971 | Kauder | 260/870 |

Primary Examiner—Howard E. Schain
Assistant Examiner—W. C. Danison, Jr.
Attorney, Agent, or Firm—George D. Morris

[57] ABSTRACT

Block copolymers can be prepared by reacting a polyester resin or a polyol with a hydroxyl or carboxyl functional mercaptan and subsequently reacting the mercapto-blocked polyester or polyol in the presence of peroxygen-type or azo-type catalyst, with selected alpha, beta-ethylenically unsaturated monomer(s), such as diacetone acrylamide, acrylic acid, methacrylic acid, ethyl acrylate, butyl acrylate, styrene, methyl methacrylate, methacrylonitrile and the like. Such block copolymers provide for coating compositions having physical properties which provide for useful protective and decorative films.

13 Claims, No Drawings

MERCAPTAN BLOCKED THERMOSETTING COPOLYMERS

This is a division of application Ser. No. 248,846, filed May 1, 1972.

BACKGROUND OF THE INVENTION

Block copolymers are well-known in the art and can be prepared by employing a number of syntheses, e.g., multi-functional initiators, radical and irradiation syntheses, mechanochemical syntheses, coupling reactions, alkylene oxide syntheses, and ionic reactions. One of the most versatile laboratory syntheses of block copolymers makes use of polymeric phthaloyl peroxide as the initiator. The first monomer is polymerized at as low a temperature as possible and to a low degree of conversion to give a polymer which, when isolated, contains segments of the polymeric initiator. By dissolving the isolated polymer in the second monomer and polymerizing at a higher temperature, block copolymeric macromolecules are synthesized. The first method of synthesizing block copolymers reported was a photoinitiation study of the vapor-phase polymerization of monomers. A film of poly(methyl methacrylate) was deposited on the walls of an evacuated reaction vessel and then chloroprene vapor is admitted. This was block copolymerized by the unterminated radicals of the polymer that were first formed. The flow method of synthesizing block copolymers has also been employed which consists of subjecting a photosensitized monomer to ultraviolet radiation as it passes through a capillary tube into a reservoir of a second monomer, wherein mixing takes place. Likewise, block copolymers can be synthesized by subjecting a mixture of two compatible polymers to mechanical degradation, by subjecting a mixture of two polymers to mechanical degradation in the presence of a crosslinking agent, by subjecting a polymer plasticized with a polymerizable vinyl monomer to mechanical degradation, or by mechanically degrading a polymer in the presence of oxygen to introduce peroxidic groups that can then be used to initiate block copolymerization at a later stage. Degradative process takes place during mastication, milling, calendering, vibromilling, cavitational ultrasonic irradiation, high-speed stirring, and the like. Condensation reactions have been utilized to couple together polymer molecules containing hydroxyl, carboxyl, amine, thiol and certain esters to give block copolymers which are essentially linear in structure. Also employed in the art are ionic reactions to provide living polymers, e.g., sodium complex of napthalene, when formed in a moisture-free tetrahydrofuran solution, is a stable green ion radical that may be used to polymerize styrene at low temperatures. These "living" polymers are well suited to the synthesis of block copolymers by the addition of a second monomer species which was also polymerized by an anionic mechanism. Poly(styrene-b-isoprene), poly(styrene-b-acrylonitrile), poly(styrene-b-1-vinylnaphthalene) and the like have been synthesized in this manner. Still another method employed provides for the polymerization of ethylene oxide by hydroxyl-containing compounds. Since poly(propylene oxide) has a terminal hydroxyl group, it can be used to initiate the block copolymerization of ethylene oxide to give poly(propylene oxide-b-ethylene).

In the past, the use of mercaptans has been limited. For example, ethyl mercaptan has been used as a starting material for making sulfonal and the lower mercaptans have been employed as odorants for natural gas. 2-Mercaptobenzothiazole is an important rubber accelerator. Mercaptans are useful as oxidation inhibitors, for example, mercaptoacetic acid has been employed in hair waving processes. Methyl mercaptan is now becoming important for the synthesis of amino acid methionine and mercaptans have also been employed as initiators for the polymerization of unsaturated carboxylic acid amides with other ethylenically unsaturated monomers.

As related to polymer preparation, mercaptans have been employed to control the polymerization in the manufacture of resin polymers and rubber compositions where large amounts of dodecyl mercaptan and other higher mercaptans are consumed in such processes.

DESCRIPTION OF THE INVENTION

Now it has been discovered that certain mercaptan-containing compounds can be reacted with a polyester or polyol to form a mercapto (sulfhydril) terminated reaction product which may subsequently be reacted in the presence of peroxygen or azo- catalyst with selected vinyl monomers to provide block copolymer compositions. More particularly, this invention relates to a novel method of producing block copolymers which comprise reacting a hydroxyl or carboxyl-containing mercaptan with a polyester or polyol in such a manner as to provide for a mercapto-terminated reaction product that may be subsequently reacted with reactive vinyl monomers such as diacetone acrylamide, acrylic acid, methacrylic acid, 2-hydroxyethyl acrylate, ethyl acrylate, butyl acrylate, styrene, methyl methacrylate, methacrylonitrile, and the like.

The said block copolymers may be readily employed in formulating coating compositions which are useful as protective and/or decorative films.

The polyester component of this invention may be saturated, unsaturated or oil-modified such as those polyesters well known in the art. Polyesters are prepared by reacting a polyhydric alcohol (polyol) and a polybasic acid.

Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerythritol, sorbitol, mannitol, methyl glycoside, 2,2-bis(hydroxyethoxyphenyl) propane, 2,2-bis (beta-hydroxypropoxyphenyl) propane and the like. Mono-functional alcohols may also be employed to supplement the other polyols and to provide for a particular characteristic which is desirable. Useful alcohols include those having a hydrocarbon chain comprising from about 3 to about 18 carbon atoms.

Generally, suitable diols include glycols of the formula $HO(CH_2)_nOH$ in which $n$ equal 2 to 10, glycols of the formula $HO(CH_2O)_nH$ and $HO[CH(CH_3)CH_2O]_nH$, in which $n$ equals 1 to 40. Specific diols that may be employed include, for example, 2,2-dimethyl-1,3-propanediol, 2,2-diethyl-1,3-propanediol, 2,2-diethyl-1,3-propanediol, 3-methyl-1,5-pentanediol, N-methyl and N-ethyl diethanol amines. Others include 4,4'-methylenbiscyclohexanol, 4,4'-isopropylidenebiscyclohexanol and various xylene diols, hydroxymethyl phenylethyl alcohols, hydroxymethyl-phenyl propanols, phenylene diethanols, phenylenedipropanols and heterocyclic diols such as 1,4-piperazinediethanol and the like.

Some of the preferred diols include 2-methyl-2-ethyl-1,3-propanediol, 2-ethyl-1,3-hexanediol and 2,2-dimethyl-3-hydroxypropyl 2,2-dimethyl-3-hydroxypropionate. Various other tri-functional polyols known in the art may be used.

The acid component of such polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized in addition to the above-mentioned acids include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example, phthalic acid, tetrahydroxyphthalic, hexahydroxyphthalic, endomethylenetetrahydroxyphthalic anhydride, tetrachlorophthalic anhydride, hexachloroendomethylene tetrahydrophthalic, and the like. The term acid as used in this specification and appended claims includes the corresponding anhydrides, where such anhydrides exist.

In many instances it is optional to include a fatty acid. These include saturated fatty acids such as decanioc, dodecanoic, tetradecanic, hexadecanic, octadecanic, eicosanic, docosanic, and the like. And in addition, unsaturated fatty acids may be used such as 9-octadecenoic, 9,12-octadecadieoic, 9,12,15-octadecatrienoic, 9,11,13-octadecatrienoic, 4-keto-9,11,13-octadecatrienoic, 12-hydroxy-9-octadeconic, 13-docosenic, and the like.

Oil-modified polyesters are likewise suitable for purposes of this invention.

In the preparation of the oil-modified polyester resins, it is possible to replace the saturated and/or unsaturated fatty acids with other monocarboxylic acids and thus further modify the properties of the end groups. Suitable monocarboxylic acids are, for example, natural resin acids such as abietic acid, neoabietic acid, laevo-pimaric acid, hydrogenated and partially hydrogenated resin acids, such as dihydro- and tetrahydroabietic acid, also benzoic acid and p-tert.-butyl-benzoic acid, as well as technical mixtures of fatty and resinic acids known by the name of tall oil.

The preparation of the oil-modified polyester resin can be carried out either by the use of the free fatty acids or by reesterifying the natural oils and fats, in a first step, with an equivalent quantity of polyalcohol to form the monoglycerides and then, after adding the polycarboxylic acid, completing the polycondesation. The re-esterification is suitably carried out in the presence of catalysts. Suitable catalysts are: lithium ricinoleate, sodium alcoholates, such as sodium methylate, lead oxide, zinc oxide and zinc acetate, calcium oxide and calcium acetate.

In the preparation of the oil-modified polyester resins in accordance with the re-esterification process, it is possible to use non-drying, half-drying and drying fatty oils and fats, such as peanut oil, coconut oil, palm-kernel oil, palm oil, castor oil, hemp oil, cottonseed oil, safflower oil, soy bean oil, sunflower oil, linseed oil, wood oil, oiticica oil, perilla oil and fish oils.

In the oil-modified polyester, the percent content of the oil component is between 20 and 80 percent, preferably between 30 and 65 percent. More particularly, the oil component of the resins that contain non-drying oils, such as peanut oil, coconut oil, palm-kernel oil, palm oil and castor oil is preferably between 30 and 50 percent, whereas the oil component of the resins that contain half-drying and drying oils, such as hemp oil, cottonseed oil, safflower oil, soy bean oil, sunflower oil, linseed oil, wood oil, perilla oil and fish oil is preferably between 30 and 65 percent.

Generally, in the manufacture of polyester resin, as esterification catalyst is employed. Inorganic tin salts, such as stannous halides, stannous acrylates, and stannous alkoxides, and stannic; stannic salts, and organic tin compounds. Illustrative compounds include the following:

A. stannous salts such as stannous hydroxide, stannous bromide, stannous chloride, stannous fluoride, stannous iodide, and the like;
B. stannic salts such as stannic chloride, stannic bromide, stannic fluoride and the like;
C. dialkyltin salts of carboxylic acids, such as dibutyltin diacetate, dibutyltin dilaurate, dibutyltin maleate, and the like;
D. dialkyltin oxides such as dibutyltin oxide, dioctyltin oxide, dilauryltin oxide and the like; and
E. trialkyltin hydroxide, such as trimethyltin hydroxide, tributyltin hydroxide, and the like.

The requisite equipment and conditions employed in the preparation of polyester resins are well known and documented in the art. Generally the esterification reaction is conducted in the presence of a suitable solvent, such as xylene, toluene, and the like. Temperatures commonly employed are from about 350° to about 450° F.

In addition to the polyesters described herein, a polyol alone may be blocked and subsequently reacted with vinyl monomers according to the method of this invention. Useful polyols include those mentioned hereinabove. Likewise, diols such as 2-methyl-2-ethyl-1,3-propanediol, 2-ethyl-1,3-hexanediol, polycaprolactone diols, 2,2-dimethyl-3-hydroxypropyl 2,2-dimethyl-3-nydroxypropionate, 4,4'-methylenebiscyclohexanol, and various xylenediols, hydroxymethyl-phenylethyl alcohols, phenylene diethanols, phenylene dipropanols, heterocyclic diols, and the like may be utilized.

The mercaptans employed in this invention can be any organic compound containing an -SH group and another group which is reactive with the polyester resin or polyol such groups include carboxyl, hydroxyl, amine, epoxy, and the like. However, for purpose of this invention the preferred mercaptans are those comprised of a hydrocarbon chain having pendant hydroxyl or carboxyl groups, wherein said hydrocarbon chain may be saturated or unsaturated aliphatic, saturated or unsaturated alicyclic, saturated or unsaturated alipahtic-aromatic, or saturated or unsaturated aromatic. The said hydrocarbon chain may contain up to about 18 carbon atoms. In some instances, these hydrocarbon chains may contain other substituents such as halogens, ester groups, ether groups, and the like. The only requirement is the additional substituents do not interfere with the desired reaction. Some specific examples of useful mercaptans include mercaptoacetic acid, 2-mercaptoethanol, 2,3-dimercapto-1-propanol, 2,2-dimercaptoisobutyric acid, cysteine, o-mercaptobenzoic acid, 3- mercaptopropanol, and the like.

Also low molecular weight acrylic polymers have by polymerization initiated by employing succinic acid peroxide and the like. These polymers are formed from components that provide for a terminal carboxyl group. This carboxyl group is subsequently reacted with mercaptoethanal or the like until the theoretical amount of water has been removed from the reaction mixture. The resultant polymer now has a mercaptan group which may act as a chain transfer agent during further polymerization procedure as described below.

The amount of mercaptan employed is not critical and may vary depending on the reactivity of the mercaptan, the functionality of the polyester or polyols employed, and upon the reaction conditions. However, it is desirable to employ a molar amount sufficient to block at least two of the polyester functional groups in order to provide for a symetrically propagated block copolymer. The blocking reaction may be conducted in solvents such as toluene, xylene, butanol and the like. Likewise, catalysts such as those described hereinabove may be employed to accelerate the esterification reaction. The temperatures necessary to conduct this blocking reaction are generally low, for example, from about 100° to about 200° C. Of course, such temperature requirements will change depending on use of a catalyst and the reactivity of the components.

The mercapto-blocked polyester or polyol is subsequently reacted, in the presence of peroxygen or azo type catalyst, with a variety of vinyl monomers to provide the blocked copolymers of the invention herein. Useful peroxygen type catalysts include acetyl and benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, dicumyl peroxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions. Likewise, diazo compounds such as alpha-alpha-azo-di-isobutyronitrile or p-methoxyphenyl diazothio-(2-naphthyl) ether, may also be used as polymerization catalysts in the preparation of the blocked copolymers of this invention. Redox catalyst systems can also be employed.

The quantity of catalyst employed can be varied considerably; however, in most instances it is desirable to utilize from about 0.1 percent to 2.0 percent by weight of the monomeric components. If high viscosities are desired, a low initial level of catalyst, followed by the necessary additions to get 100 percent conversion, is preferably employed. For low viscosity interpolymers, the bulk of the catalyst is added initially and later additions used only to secure desired conversions. Larger amounts of catalyst added initially give lower viscosities.

Generally, the monomers polymerized preferably include an unsaturated carboxylic acid amide and at least one other ethylenically-unsaturated monomer, however, any desired monomer combination may be employed.

The amount of the particular monomers utilized is not critical and will depend on the characteristics desired to be imparted to the final block copolymer.

Amides that may be utilized include acrylamide, diacetone acrylamide, methacrylamide, itaconic acid diamide, alpha-ethyl acrylamide, crotonamide, maleamic acid and esters, maleuric acid and esters and other amides of alpha, beta-ethylenically unsaturated carboxylic acids containing up to, for example, about 10 carbon atoms. However, an acrylamide is preferred, this term being utilized to include acrylamide, diacetone acrylamide, methacrylamide and similar alpha-substituted acrylic amides, and N-substituted acrylic amides, such as N-butoxymethylacrylamide and N-butoxymethylmethacrylamide.

While acrylamide is the particularly preferred unsaturated amide for use in preparing the resinous compositions of this invention, other unsaturated amides such as methacrylamide, itaconic diamide, maleuric acid, and esters thereof as represented by the formula:

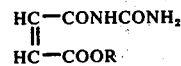

wherein R is an alkyl radical, and imide derivatives such as N-carbamyl maleimide of the structure:

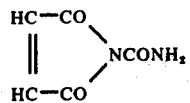

may also be utilized.

The monomer or monomers with which the amide may be interpolymerized may be any ethylenic compound copolymerizable with the unsaturated amide, the polymerization taking place through the ethylenically unsaturated bonds. These include monoolefinic and diolenfinic hydrocarbons, halogenated monoolefinic and diolefinic hydrocarbons, unsaturated esters of organic and iorganic acids, esters of unsaturated acids, nitrile, unsaturated acids, and the like.

1. Monoolefinic hydrocarbons, that is, monomers containing only atoms of hydrogen and carbon, such as styrene, alpha-methyl styrene, alpha-butyl styrene, alpha-ethyl styrene, and the like;

2. Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and parafluorostyrenes, 2,6-dichlorostyrene, 2,6-difluorostyrene, 3-fluoro-4-chlorostyrene, 3-chloro-4-fluorostyrene, 2,4,5-trichlorosytrene, dochloromonofluorostyrens, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1-chloro-2,2,2-trifluoroethylene, and the like.

3. Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl-o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, Methyl acrylate, ethyl acrylate, propyl acrylate, isopropyl acrylate, butyl acrylate, isobutyl acrylate, amyl acrylate, hexyl arcylate, 2-ethylhexyl acrylate, heptyl acrylate, octyl acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valearte, isopropenyl caproate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alphabromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alphabromovalerate;

Allyl chloride, allyl cyanide, allyl bromide, allyl fluoride, allyl iodide, allyl chlorocarbonate, allyl nitrate, allyl thiocyanate, allyl formate, ally acetate, allyl propionate, allyl butyrate, allyl valerate, allyl caproate, allyl-3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters as well as esters from such alkenyl alcohols beta-ethyl allyl alcohol, beta-propyl allyl alcohol, 1-butene-4-ol, 2-methyl-butene-ol-4, 2(2,2-dimethylpropyl)-1-butene-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano-acrylate, ethyl alpha-cyanoacrylate, amyl alpha-cyano acrylate and decyl alpha-cyano acrylate;

Dimethyl maleate, diethyl maleate, diallyl maleate, dimethyl fumarate, diethyl fumarate, dimethylallyl fumarate and diethyl glutaconate;

4. Organic nitriles such as acrylonitrile, methacrylonitrile, ethacrylonitrile, 3-octenenitrile, crotonitrile, oleonitrile, and the like;

5. Acid monomers such as acrylic acid, methacrylic acid, crotonic acid, 3-butenoic acid, angelic acid, tiglic acid, and the like;

6. Monomeric dienes such as butadiene-1,3,2-methyl butadiene-1,3, 2-chlorobutadiene-1,3, 2-bromobutadiene-1,3, and the like; and 7. Monomeric ketones such as isopropenyl methyl ketone, vinyl methyl ketone, and the like.

In general, it is preferred that the monomer utilized contain a single $CH_2=C<$ in terminal position, which group is activated by a negative substituent, and an especially preferred group of monomers includes ethyl acrylate, methyl methacrylate, butyl acrylate, ethylhexyl acrylate, styrene, vinyl toluene, and monomethyl styrene.

It is to be understood that the above polymerizable olefinic monomers are representative only, and do not include all of the $CH_2=C<$ containing monomers which may be employed.

The preferred monomers include acrylates, methacrylates, vinyl aromatic hydrocarbons, unsaturated acids and unsaturated esters of organic acids.

Generally, the blocked copolymers of this invention may be prepared by any of the techniques known in the art; however, for purposes of this invention the batch type process and continuous addition method are preferred.

The polymerization generally requires an external heat source, but the preferred temperature of operation depends somewhat on the reactivity of the monomer(s) employed and the amount of catalyst utilized. Generally, however, the polymerization of this invention may be carried out at as low as about 20° to as high as about 250° C. or higher. Thus, depending on the desired end results, amides, catalysts and unsaturated monomers utilized, the use of an external heat source may be employed to accelerate the reaction as desired.

Generally, the reaction is carried out in an organic solvent in which the monomers are soluble at reaction temperature. Butanol or other lower alkanols, the Cellosolves and Carbitols, e.g., ethyl Cellosolve and butyl Carbitol, are satisfactory for this purpose. Butyl or ethyl acetate or other ester solvents can also be included in the reaction medium, as can aliphatic and aromatic hydrocarbons, such as toluene, xylene, naphthas, and the like. Ketones may also be utilized, for instance, methyl ethyl ketone.

The block copolymers of this invention may be blended or admixed with other co-curing or crosslinking resins or reactive materials such as vinyl chloride; the alkyd resins, both oil-modified and non-oil modified; epoxidized oils, that is, epoxidized fatty acid esters, preferably containing at least 8 carbon atoms; amide resins, such as urea-formaldehyde resins and melamineformaldehyde resins; nitrocellulose resins; hydrocarbon resins, such as polyethylene and polypropylene; phenolic resins; as well as any other resinous materials compatible with the block copolymers herein.

When the block copolymer and blends described above are utilized in forming coating compositions, pigments, such as titanium dioxide, carbon black, talc, barytes, zinc sulfate, strontium chromate, barium chromate, ferric iron oxide, as well as color pigments, such as cadmium yellow, cadmium red, toluidine red, hydrated iron oxide, and the like, may be added to form any desired color and to enhance the film.

To illustrate the manner of producing the block copolymers of this invention, there are set forth below several examples of their preparation. The parts and percentages are by weight and are based upon nonvolatile resin solides content.

EXAMPLE I

A block intermediate was prepared in the following manner:

Block Intermediate A

A three-necked round-bottom reactor vessel was equipped with a thermometer, reflux condenser, mechanical stirrer and a means to provide an inert blanket of nitrogen gas. Into the said vessel the following components were charged:

|                                              | Parts by Weight |
|----------------------------------------------|-----------------|
| Mercaptoacetic acid (98 percent pure)        | 184.0           |
| Polycaprolactone polyol (Union Carbide's ester diol-Niax PCP-0230) | 125.0 |
| Toluene                                      | 50.0            |
| Phosphoric acid (85 percent solution)        | 0.7             |

The above components were heated over one-hour period to a temperature of 150° C. and 50.0 parts of toluene were added. The reaction continued for 25 minutes and an additional 40 parts of toluene were added and 20 minutes later a further addition of 40 parts of toluene were added. Again, the reaction was a permitted to continue for 3¼ hours and after 18 parts of mercaptoacetic acid were added, the reaction temperature was maintained at 150° C. for about 6 hours. During the reaction time, a total of 34 parts of water were collected as a by-product of the esterification process.

This intermediate was employed in the following manner to provide a block copolymer:

|                                              | Parts by Weight |
|----------------------------------------------|-----------------|
| n-Butoxymethylacrylamide (65 percent solids in a solution comprising 3 parts butanol and 1 part xylene) | 506.0 |
| Methacrylonitrile                            | 281.0           |
| Methyl methacrylate                          | 417.0           |
| Styrene                                      | 281.0           |
| Ethyl acrylate                               | 247.0           |
| Methacrylic acid                             | 35.0            |
| Alpha, alpha'-azobisisobutyronitrile         | 11.8            |
| Block intermediate A (above)                 | 673.0           |

A total of 304.0 parts of the above mixture and 192 parts xylene were charged into a four-necked round-bottom reactor equipped with a thermometer, reflux condenser, mechanical stirrer and a dropping funnel into which the remainder of the above mixture was charged. The reactor contents under an inert blanket of nitrogen were heated to reflux (110° C.) and the contents of the dropping funnel were added over a 2-hour period. Then 15.0 parts of xylene were added followed by a solution comprising 195.0 parts xylene and 7.3 parts butyl peroxyisopropyl carbonate which was added over a 3-hour period. After this addition was complete, another solution comprising 8.5 parts xylene and 1.65 parts butyl peroxyisopropyl carbonate was added over two hours, then the block copolymer was cooled and reduced with 760.0 parts of xylene. The copolymer so produced had the following characteristics:

|                               |         |
|-------------------------------|---------|
| Solids content (percent)      | 57.5    |
| Viscosity (Gardner-Holdt)     | Z¹      |
| Color (Gardner)               | 4+      |
| Acid number                   | 8.6     |

After this composition was drawn down on a cold roller steel panel and baked at 500° F. for one minute, the film provided had excellent appearance and good hardness and flexibility.

EXAMPLE II

A block intermediate similar to that provided in Example I was prepared as follows:

|                                              | Parts by Weight |
|----------------------------------------------|-----------------|
| Polycaprolactone polyol (Union Carbide's ester diol-Niax PCP-0200) | 1060.0 |
| Alpha-methacryloxypropyltri-methoxysilane    | 1060.0          |
| Xylene                                       | 600.0           |

The above components were charged into a reactor vessel as in Example I and heated to 90° C. under an inert atmosphere of nitrogen. A 75 percent solution of butanol containing 1.0 part phenyl acid phosphate was added and the reaction temperature rose to about 150° C. and was maintained there for 4 hours. Then 93 parts of thiovanic acid (98.6 percent pure) were added, then the temperature was lowered to about 110° C. and the temperature was permitted to rise to 148° C. A total of 55 parts of water were azeotropically distilled off. The intermediate provided had the following characteristics:

|                               |         |
|-------------------------------|---------|
| Solids content (percent)      | 78.4    |
| Viscosity (Gardner-Holdt)     | R+      |
| Color (Gardner)               | 1⁻      |
| Acid number                   | 15.1    |

This intermediate was employed to provide the following block copolymer:

|                                              | Parts by Weight |
|----------------------------------------------|-----------------|
| n-Butoxymethyl acrylamide (61.5 percent solids in a solution comprising 3 parts butanol and 1 part xylene) | 272.0 |
| Methacrylic acid                             | 16.2            |
| Methacrylonitrile                            | 129.0           |
| Styrene                                      | 46.0            |
| Butyl acrylate                               | 276.0           |
| Intermediate (above)                         | 250.0           |
| 2-Hydroxyethyl acrylate                      | 22.1            |
| Alpha,alpha'-azobisisobutyronitrile          | 7.8             |

A total of 190.0 parts of the above mixture and 190.0 parts butanol were charged into a four-necked round-bottom reactor equipped as in Example I and the remainder of the monomer mixture was charged into the attached dropping funnel. The contents of the reactor were heated to a reflux (110° C.) under a blanket of nitrogen and then the monomer mixture in the dropping funnel was added over a 2hour period. At the end of this period, a solution comprising 5.4 parts butyl peroxyisopropyl carbonate and 65.0 parts Solvesso 150 was added over 4 hours while the reactants refluxed at 125°–127° C. At the termination of this 4-hour period a similar solution, comprising 0.2part butyl peroxyisopropyl carbonate and 8.4 parts Solvesso 150 was added over a further 2-hour period, then the blocked copolymer was cooled and thinned with 486.0 parts of Solvesso 150 (aromatic hydrocarbon solvent, boiling paint range 185°–200° C.) and 135.0 parts butyl Cellosolve (ethylene glycol monobutyl ether).

The block copolymer provided had the following characteristics:

| | |
|---|---|
| Solids content | 47.1 |
| Viscosity (Gardner-Holdt) | T+ |
| Color (Gardner) | 0 |
| Acid number | 6.4 |

A clear film of this block copolymer was drawn down, on a cold-rolled steel panel, at sufficient thickness in order to provide a film of 1.0 mil after baking 65 seconds at 500° F. The film provided had an H pencil hardness and good flexibility.

The block intermediates of Examples I and II may be reacted with monomer combinations other than those above. Examples of suitable monomer mixtures include the following:

| | Parts by Weight |
|---|---|
| MIXTURE A | |
| Vinyl acetate | 1914.0 |
| 2-Hydroxyethyl acrylate | 106.0 |
| MIXTURE B | |
| Butyl acrylate | 990.0 |
| Styrene | 720.0 |
| Methacrylic acid | 90.0 |
| MIXTURE C | |
| Vinyl acetate | 1500.0 |
| Ethyl acrylate | 400.0 |
| MIXTURE D | |
| Acrylamide | 300.0 |
| Styrene | 500.0 |
| Ethyl acrylate | 1200.0 |
| MIXTURE E | |
| Acrylamide | 300.0 |
| Methyl methacrylate | 500.0 |
| Ethyl acrylate | 1200.0 |
| MIXTURE F | |
| Styrene | 39.0 |
| Ethyl acrylate | 44.0 |
| Acrylamide | 15.0 |
| Acrylic acid | 2.0 |
| MIXTURE G | |
| Acrylamide | 20.0 |
| Styrene | 40.0 |
| Butadiene | 40.0 |
| MIXTURE H | |
| Acrylamide | 20.0 |
| Vinyl toluene | 80.0 |

These monomer mixtures when reacted with the block intermediates of this invention provide block copolymer compositions which are, likewise, suitable for formulating useful protective and decorative films.

Polyesters and polyols other than those employed hereinabove may be utilized where desired. For example, any saturated, unsaturated or oil-modified polyester known in the art may be employed. Likewise, other polyols such as propylene glycol, 1,5-pentanediol, trimethylolethane, pentaerythritol and the like can be substituted for those hereinabove. Other mercaptans that are useful and can be readily employed include cystein, 2,2'-dimercapto-1-propanol, o-mercaptobenzoic acid, and the like.

In addition, some of the other ethylenically unsaturated monomers that may be utilized include methacrylamide, acrylamide, styrene, alpha-methyl styrene, alpha-bromostyrene, vinyl acetate, vinyl propionate, dimethyl maleate, methacrylonitrile, acrylic acid and the like.

Also the block copolymers can be blended or admixed with reactive materials such as amide resins like hexamethoxymethyl melamine, ethoxymethoxymethyl melamine and the like, as well as phenolic resins and alkyd resins.

Various properties and desirable characteristics can be imparted to the block copolymers or blends by grinding in pigments such as titanium dioxide, carbon black, ferric iron oxide, cadmium red, toluidine red, and the like.

According to the provisions of the patent statutes, there are described above the invention and what are now considered to be its best embodiments. However, within the scope of the appended claims, it is to be understood that the invention can be practiced otherwise than as specifically described.

We claim:

1. A polymer prepared by the process comprising:
   a. reacting
      1. a polyester and
      2. a mercaptan comprising an organic compound containing an —SH group and another group which is reactive with said polyester to provide a mercapto-terminated reaction product;
   b. reacting said mercapto-terminated reaction product with one or more ethylenically unsaturated monomers in the presence of a peroxygen or azo catalyst to form said polymer.

2. A polymer as in claim 1 wherein the polyester resin is prepared by reacting a polyhydric alcohol and a polybasic acid.

3. A polymer as in claim 2 wherein the polyhydric alcohol is a member of the group consisting of ethylene glycol, trimethylolpropane, neopentyl glycol, glycerol, and pentaerythritol.

4. A polymer as in claim 2 wherein the polybasic acid is a member of the group consisting of maleic acid, isophthalic acid, adipic acid and fumaric acid.

5. A polymer as in claim 1 wherein said other group which is reactive with said polyester is carboxyl or hydroxyl.

6. A polymer as in claim 1 wherein said mercaptan is comprised of a hydrocarbon chain having pendant hydroxyl or carboxyl groups and wherein said hydrocarbon chain contains up to about 18 carbon atoms.

7. A polymer as in claim 1 wherein said mercaptan is a member of the class consisting of mercaptoacetic acid, 2,2-dimercaptoisobutyric acid, cysteine and O-mercaptobenzoic acid.

8. A polymer as in claim 1 wherein said ethylenically unsaturated monomer contains a single $CH_2=C<$ in a terminal position, which group is activated by a negative substituent.

9. A polymer as in claim 1 wherein the ethylenically unsaturated monomer is a member of the class consisting of acrylates, methacrylates, vinyl aromatic hydrocarbons, unsaturated acids and unsaturated esters of organic acids.

10. A polymer as in claim 1 wherein said ethylenically unsaturated monomer is a member of the class consisting of ethyl acrylate, methyl methacrylate, butyl acrylate, ethylhexyl acrylate, styrene, vinyl toluene and monomethyl styrene.

11. A polymer as in claim 1 wherein said mercapto-terminated reaction product is reacted with a plurality of said ethylenically unsaturated monomers and wherein one of said ethylenically unsaturated monomers is an unsaturated carboxylic acid amide.

12. A polymer as in claim 11 wherein the aide is selected from the group consisting of acrylamide, diacetone acrylamide and n-butoxymethylacrylamide.

13. An article of manufacture comprising a substrate having a coating of the polymer of claim 1 applied thereon.

\* \* \* \* \*